No. 708,451. Patented Sept. 2, 1902.
W. W. ANNABLE.
TROLLEY WHEEL.
(Application filed Jan. 7, 1902.)
(No Model.)

Witnesses
Palmer A. Jones.
Tyler E. Wheeler

Inventor
Warren W. Annable
By Luther V. Moulton
Attorney

THE NORRIS PETERS CO., PHOTO-LITHO., WASHINGTON, D. C.

UNITED STATES PATENT OFFICE.

WARREN W. ANNABLE, OF GRAND RAPIDS, MICHIGAN, ASSIGNOR TO APPLIANCE COMPANY, LIMITED, OF GRAND RAPIDS, MICHIGAN, A CORPORATION OF MICHIGAN.

TROLLEY-WHEEL.

SPECIFICATION forming part of Letters Patent No. 708,451, dated September 2, 1902.

Application filed January 7, 1902. Serial No. 88,807. (No model.)

*To all whom it may concern:*

Be it known that I, WARREN W. ANNABLE, a citizen of the United States, residing at Grand Rapids, in the county of Kent and State of Michigan, have invented certain new and useful Improvements in Trolley-Wheels; and I do hereby declare the following to be a full, clear, and exact description of the invention, such as will enable others skilled in the art to which it appertains to make and use the same.

My invention relates to improvements in bearings for trolley-wheels; and its objects are to increase the bearing-surfaces, to decrease the electrical resistance, to provide improved means of lubricating the bearing, and to provide the device with certain new and useful features hereinafter more fully described, and particularly pointed out in the claims.

My invention consists, essentially, in providing the trolley-wheel with a tubular axle rotative with the wheel and having both internal and external bearings, and, further, in making the internal bearing hollow or tubular to receive a lubricant and providing it with lateral openings for escape of the lubricant, and in certain details of construction and arrangement of parts, as will more fully appear by reference to the accompanying drawings, in which—

Figure 1:
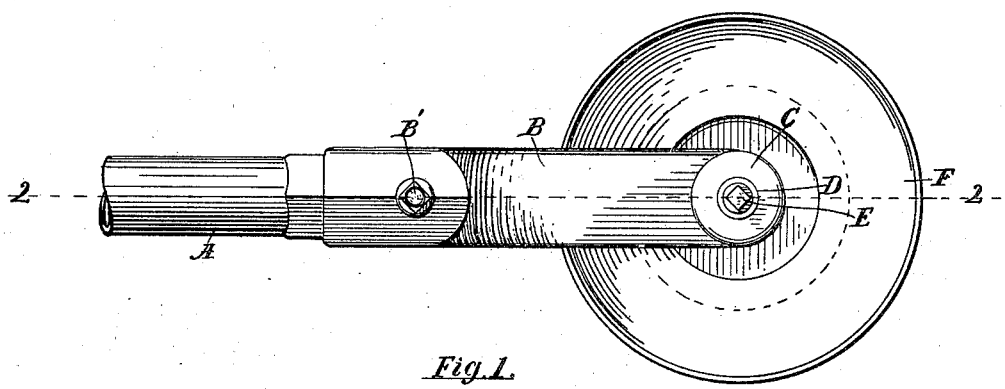
Figure 2:
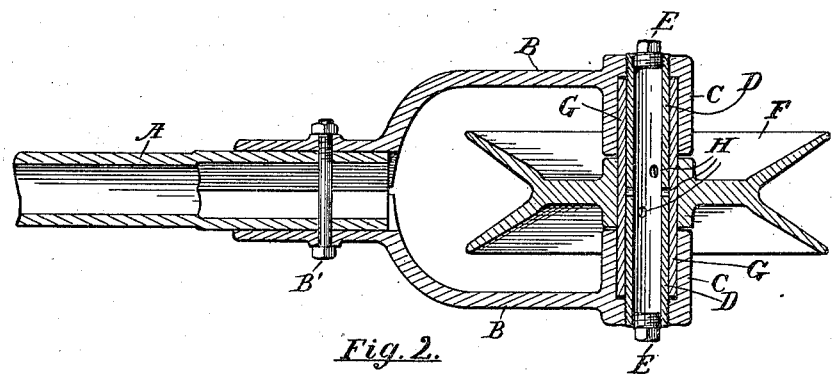
Figure 3:
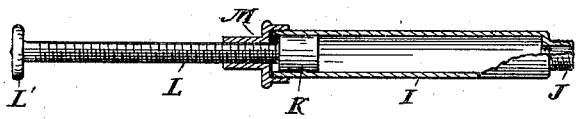

Figure 1 is a side elevation of a device embodying my invention; Fig. 2, a horizontal section of the same on the line 2 2 of Fig. 1, and Fig. 3 a device adapted to insert a plastic lubricant within the inner tube.

Like letters refer to like parts in all the figures.

A represents a portion of a trolley-pole, to which is secured the respective sides B B of the harp by means of a bolt B'. The harp is provided with large bosses C, forming bearings engaging the outer surface of a tubular axle G, fixed in the trolley-wheel F and rotating therewith and projecting laterally from the wheel. This axle does not extend wholly through the bosses C, and the openings in said bosses are reduced outside the ends of the axle G and internally threaded to engage threads on the respective ends of the inner tube D. This tube D thus rigidly ties the outer ends of the harp sides together and also furnishes an internal bearing for the tubular axle G.

E E are screw-plugs closing the ends of the tube D and are removable for insertion of a lubricant within the tube.

H H are openings for escape of the lubricant, which flows between the tubes D and G and thence outward around the ends of the tube G and over its outer surface.

By the described construction I provide a bearing consisting of the entire inner surface of the tube G and also all of its outer surface except the small portion at the middle occupied by the trolley-wheel. This large bearing-surface thus reduces the electrical resistance of the bearing and also enables the bearing to wear longer. The inner tube is adapted to be charged with a plastic lubricant by means of a device shown in Fig. 3, which latter consists of a cylinder I to contain the lubricant and having a screw-threaded nozzle J at one end adapted to be inserted in place of one of the plugs E and a removable cap M at the other end having a screw-threaded opening in which is a screw-threaded stem L, having on its inner end a piston K to force the lubricant through the nozzle and into the tube D as the screw is turned outward.

Having thus fully described my invention, what I claim, and desire to secure by Letters Patent, is—

1. The combination of a trolley-wheel, a tubular axle fixed in the wheel and projecting therefrom, and bearings engaging both the interior and exterior surfaces of the tubular axle, substantially as described.

2. The combination of a trolley-wheel, a tubular axle fixed in the wheel and projecting laterally therefrom, a harp having bearings engaging the outer surfaces of the ends of the tubular axle, and a bearing extending through the axle and attached to the respective sides of the harp and rigidly connecting the same, substantially as described.

3. The combination of a trolley-wheel, a tubular axle in the wheel and projecting laterally therefrom, a harp made in two parts and connected at one end by a bolt, and at the other end by a bearing engaging the interior of the tubular axle, and bosses on the harp having bearings engaging the outer surfaces of the tubular axle, substantially as described.

4. The combination of a trolley-wheel, a tubular axle in the wheel and projecting laterally therefrom, a harp having tubular bosses forming external bearings for the axle, screw-threaded openings in the bosses, a screw-threaded tube engaging the threads in the bosses and having lateral openings and also forming an internal bearing for the axle, and a removable plug in said tube, substantially as described.

5. The combination of a trolley-pole, a harp having two parts attached to the pole at one end and having tubular bosses at the other end having bearing-surfaces at their adjacent ends, and reduced and screw-threaded openings at their outer ends, a screw-threaded tube rigidly connecting the bosses and having lateral openings, removable plugs in said tube, a rotative tubular axle internally engaging the tube and externally engaging the bearings in the bosses, and a trolley-wheel mounted on the axle, substantially as described.

In testimony whereof I affix my signature in presence of two witnesses.

WARREN W. ANNABLE.

Witnesses:
FRANK A. SIMONDS,
PALMER A. JONES.